United States Patent
Miller

(10) Patent No.: US 8,026,307 B2
(45) Date of Patent: Sep. 27, 2011

(54) TWO COMPONENT CURABLE COMPOSITIONS

(75) Inventor: Michelle Miller, Bury St Edmonds (GB)

(73) Assignee: Huntsman Advanced Materials Americas LLC, The Woodlands, TX (US)

( * ) Notice: Subject to any disclaimer, the term of this patent is extended or adjusted under 35 U.S.C. 154(b) by 1158 days.

(21) Appl. No.: 10/577,880

(22) PCT Filed: Nov. 3, 2004

(86) PCT No.: PCT/EP2004/052765
§ 371 (c)(1),
(2), (4) Date: Apr. 28, 2006

(87) PCT Pub. No.: WO2005/042630
PCT Pub. Date: May 12, 2005

(65) Prior Publication Data
US 2007/0072981 A1    Mar. 29, 2007

(30) Foreign Application Priority Data
Nov. 4, 2003 (EP) ..................... 03256951

(51) Int. Cl.
*C08K 3/18* (2006.01)
*C08K 3/34* (2006.01)
(52) U.S. Cl. .................. 524/437; 524/445; 524/447
(58) Field of Classification Search .......... 524/164, 524/445, 447, 437
See application file for complete search history.

(56) References Cited

U.S. PATENT DOCUMENTS

| | | | |
|---|---|---|---|
| 2,887,458 A * | 5/1959 | Fitzgerald et al. | 427/374.1 |
| 4,810,734 A | 3/1989 | Kawasumi et al. | |
| 5,554,670 A | 9/1996 | Giannelis et al. | |
| 5,707,477 A | 1/1998 | Cloud | |
| 5,760,106 A | 6/1998 | Pinnavaia et al. | |
| 5,773,047 A | 6/1998 | Cloud | |
| 5,853,886 A * | 12/1998 | Pinnavaia et al. | 428/403 |
| 6,077,886 A | 6/2000 | Hayes et al. | |
| 6,197,849 B1 * | 3/2001 | Zilg et al. | 523/216 |
| 6,342,295 B1 * | 1/2002 | Kobayashi | 428/323 |
| 6,579,927 B1 | 6/2003 | Fischer | |
| 2004/0013865 A1 | 1/2004 | Kotnis et al. | |

FOREIGN PATENT DOCUMENTS

| | | |
|---|---|---|
| CN | 1 375 511 | 10/2002 |
| CN | 1 417 282 | 5/2003 |
| CN | 1 434 070 | 8/2003 |
| EP | 0 267 341 A1 | 5/1988 |
| EP | 1 038 913 | 9/2000 |
| EP | 1 209 189 A1 | 5/2002 |
| FR | 1452942 | 8/1966 |
| WO | WO 98/51747 | 11/1998 |
| WO | WO02/20261 | 3/2002 |
| WO | WO 03/016394 | 2/2003 |
| WO | WO 03/044089 | 5/2003 |
| WO | WO 03/051282 * | 6/2003 |
| WO | WO 2007/055498 * | 5/2007 |

OTHER PUBLICATIONS

"Polyurethane nanocomposites containing Laminated Anisotropic Nanoparticles Derived from Organophilic Layered Silicates" by Carsten Zilg, published in Advanced Materials, VCH, Verlagsgesellschaft, Weinheim, DE, vol. 11, No. 1 Jan. 7, 1999, pp. 49-52.
"Polymer-layered silicate nanocomposites: Preparation, properties and uses of a new class of materials", Materials Science and Engineering R : Reports, Elsevier Sequoia S.A., Lausanne, CH, vol. 28, No. 1-2, Jun. 2000, pp. 1-63.
"Calculating Phase Diagrams of Polymer-Platelet Mixtures Using Density Functional Theory : Implications for Polymer/Clay Composites" MACROMOLECULES, vol. 32, 1999, p. 5681-5688.

* cited by examiner

*Primary Examiner* — Vickey Nerangis

(57) ABSTRACT

A two component reactive composition is described. Each component, before they are mixed together, contains a filler having thin platelet structure, e.g. a nanoclay, and a further filler that interacts with the platelets. The individual components can have a filler loading that makes them flowable and therefore the components can readily be mixed together for ready dispensing. When the components are mixed thoroughly together, the resulting resin may have a viscosity higher than that of the individual components. The loading of the filler is preferably chosen so that the resulting blended resin is capable of being applied on to a vertical surface without experiencing significant slump. The viscosity of the mixed material can be up to 5 to 10 times or more than that of the individual components before mixing. The composition can be used in adhesives, modelling pastes, coatings, sealants, putties, mastics, stopping compounds, caulking materials, encapsulants and surface coatings, e.g. paints.

8 Claims, No Drawings

TWO COMPONENT CURABLE COMPOSITIONS

CROSS REFERENCE TO RELATED APPLICATIONS

This application is the National Phase of International Application PCT/EP2004/052765 filed Nov. 3, 2004 which designated the U.S. and which claims priority to European (EP) Pat. App. No. 03256951.9 filed Nov. 4, 2003. The noted applications are incorporated herein by reference.

TECHNICAL FIELD

The present invention relates to curable compositions containing at least two components; each component contains materials (generally monomers/oligomers/polymers) that react with materials in the other component to form a cured resin. For simplicity, such compositions will be referred to as "two component" systems, since there will generally be only two components, but it will be understood that more than two components can be used and the "two component" should be understood accordingly.

When the two components are mixed, they form a resin that cures; the curing time will depend on many factors e.g. the nature of the curable materials and the ambient temperature. Examples of 2-component resins include epoxy/amine; epoxy/acrylic/amine and isocyanate/polyol systems and also hybrid systems such as epoxy/isocyanate-polyol/amines; epoxy/anhydride; and cyclocarbonate/epoxy/amine systems. Such materials are used in a wide variety of fields, for example adhesives, modelling pastes, coatings, sealants, putties, mastics, stopping compounds, caulking materials, encapsulants and surface coatings such as paints.

BACKGROUND ART

Two-part components are widely used in many industries for many purposes, including:

1) Model making: Within the automotive, aerospace, rail, wind turbines energy fields and marine industries there is a need to produce dimensionally accurate master models, particularly of large format. These models are used by engineers for the conceptual design of the individual components utilised in the final product. More and more, such models are tested for technical and functional use, thus requiring technical material properties.

U.S. Pat. Nos. 5,707,477 and 5,773,047 describe a method for making prepreg parts for use in the aerospace industry where pliable solid patties prepared from syntactic epoxy material are hand-applied to a block made by stacking successive layers of aluminium honeycomb core. The entire resulting structure is then heated to effect cure of the patties. However, this approach is again labour intensive, in that it involves hand application of the pliable solid patties to the honeycomb core. It also requires heating of the entire structure in order to cure the applied patties. The resulting models are also of relatively high density.

WO02/20261 describes a method of making models by making a sub-structure, applying a foamed mixed two-component resin (epoxy/amine or isocyanate/polyol systems) to the substructure to form a continuous layer, curing the resin and machining or hand cutting the cured resin to shape. This method is referred to as "net size casting" using a "seamless modelling paste" (SMP). The paste includes a thixotropic agent to increase the thixotropy of the paste after mixing and dispensing onto the substructure to ensure that the paste does not sag during curing. Amines are given as examples of suitable thixotropic agents.

2) Adhesives In the aerospace, auto, rail, structural and other industries, two-part adhesives are widely used, e.g. in wind turbine blade bonding and to bond other structures. Thixotropic and gap filling adhesives are of special interest for successful bonding of large structures in order to achieve even, stress-free bonding, without flow out at the edges of the structures being bonded. Thixotropic high strength adhesives are also useful if they can be dispensed as 'ropes' onto vertical or slanting surfaces to adhere protective barrier panelling, e.g. on the sides of liquid gas tanks or fuel carriers 3) Component manufacture Two-part curable resins are also used to form heavy electrical mouldings. Of especial interest are flowable thermosetting compositions which can mix very well, set and cure evenly in the casings of large transformers.

4) Paints and coatings Two-part curable resins are also used to form paints, e.g. automotive paints, and coatings and mouldings.

The above are given as examples of the use of two-component curable resins but the list is by no means exhaustive.

It is important that the individual components are flowable so that they can readily be mixed, especially when using machines that both mix and dispense the mixed composition. This sets certain limits on the viscosities that can be utilised and, in turn, sets limits on fillers and thixotropic agents that can be used, ultimately setting limits on the final properties that can be reached.

In many applications there is a need for the two-component composition to have a high viscosity shortly after mixing to provide a resistance to slump, i.e. a change in shape once the mixed composition has been placed in a desired location. The degree of non-slumping required can even be that of retaining almost exactly the shape and dimensions achieved by extruding the compositions through a shaped orifice. This non-slump texture is frequently obtained by dispersing a thixotropic agent such as a hydrophilic fumed silica in one of the components to blends, provided sufficient thixotropic agent is used, that generally retain their shape and non-slump properties until they are gelled and cured. A thixotropic composition can be defined as a composition whose viscosity under shear is lower than under no shear.

However, adding agents to increase the viscosity after mixing generally requires the individual components to also have high viscosities, even though they are thixotropic to a degree and hence have lower viscosities under shear than under no shear. The high viscosities of the components leads to difficulty in mixing the components together especially when mixing is achieved automatically during the dispensing of the mixture, leading to poor mixing of the components and hence a reduction in the properties of the cured resin.

This is especially true when using platelet nanofillers that increase the viscosity of compositions substantially, even at low loadings if highly dispersed.

Nanoparticles

Nanoparticles are particles of nanosize i.e. having at least one dimension on nanometer scale. They can be derived of naturally occuring- or synthetized-clay minerals, hence the name of nanoclays. Clays are generally phyllosilicates such as of the smectite group, for example a bentonite, montmorillonite, hectorite, saponite or the like. The surface of the clay can be modified to become organophilic hence the name of organoclays. The inorganic exchangeable cations which occurs in natural or synthetic clay mineral are replaced by organic cations comprising sufficient carbon atoms to render the surface of the cation-exchanged clay hydrophobic and organophilic. For example U.S. Pat. No. 4,810,734 discloses phyllosilicates which can be treated with a quaternary or other ammonium salt of a primary, secondary or tertiary organic amine in the presence of a dispersing medium.

Nanoclays are often plate-like materials also called platelets. Platelets have 2 dimensions higher than the third one, they have a planar extent and a thickness. Fibers have one dimension higher than the 2 others, no planar extent but a high length.

Researchers have concentrated on four nanoclays as potential nanoscale particles (nanoparticles): a) hydrotalcite, b) octasilicate, c) mica fluoride and d) montmorillonite. The first two have limitations both from a physical and a cost standpoint. The last two are used in commercial nanocomposites. Mica fluoride is a synthetic silicate, montmorillonite (MMT) is a natural one. The theoretical formula for montmorillonite is:

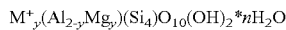

$$M^+{}_y(Al_{2-y}Mg_y)(Si_4)O_{10}(OH)_2 \cdot nH_2O$$

Ionic phyllosilicates have a sheet structure. At the Angstrom scale, they form platelets, which can be 0.3 preferably 0.7 to 1 nm thick and several hundred nanometers (about 100-1000 nm) long and wide. As a result, individual sheets may have aspect ratios (Length/Thickness, L/T) varying from 200-1000 or even higher and, after purification, the majority of the platelets have aspect ratios in the 200-400 range. In other words, these sheets usually measure approximately 200×1 nm (L×T). These platelets are stacked into primary particles and these primary particles are stacked together to form aggregates (usually about 10-30 μm in size). The silicate layers form stacks with a gap in between them called the "interlayer" or "gallery". Isomorphic substitution within the layers ($Mg^{2+}$ replaces $Al^{3+}$) generates negative charges that are counterbalanced by alkali or alkaline earth cations situated in the interlayer. Such clays are not necessarily compatible with polymers since, due to their small size, surface interactions such as hydrogen bonding become magnified. Thus, the ability to disperse the clays within some resins is limited and at the beginning, only hydrophilic polymers (e.g. PVA) were compatible with the clays because silicate clays are naturally hydrophilic. But, it was found that the inorganic cations situated in the interlayer can be substituted by other cations. Cationic exchange with large cationic surfactants such as alkyl ammonium-ions, increases the spacing between the layers and reduces the surface energy of the filler. Therefore, these modified clays (organoclays) are more compatible with polymers and form polymer-layered silicate nanocomposites. Various companies (e.g. Southern Clays (of 1212 Church Street, Gonzales, Tex. USA 8629), Süd Chemie, Nanocor, etc.) provide a whole series of both modified and natural nano clays, which are montmorillonites. Apart from montmorillonites, hectorites and saponites are the most commonly used layered silicates.

A nanocomposite is a dispersion, often a near-molecular blend, of resin molecules and nanoscale particles. Nanocomposites can be formed in one of the following three ways: a) melt blending synthesis, b) solvent based synthesis and c) in-situ polymerization, as is known in the art.

There are three structurally different types of nanocomposites: 1) intercalated (individual monomers and polymers are sandwiched between silicate layers) 2) exfoliated (a "sea" of polymer with "rafts" of silicate), and 3) end-tethered (a whole silicate or a single layer of a silicate is attached to the end of a polymer chain).

There has been immense activity in the use of nano clay composites in recent years, for use in polyolefins, methacrylates (e.g. PMMA), polyamides, bio-polymers, polyurethanes, phenols, polycarbonates, to achieve benefits and claims have been made for increase in strength, flame retardency, barrier protection and high temperature resistance.

U.S. Pat. No. 6,579,927 details the formation of a nanomaterial where the clay material is homogeneously distributed throughout the polymeric matrix. The resultant nanocomposites could be moulded via injection moulding or extrusion processes.

Example 16 of the patent FR 1,452,942 discloses a two-parts epoxy adhesive composition whose hardener part contains silica, hardener, carbon an silica aerogel whereas the resin part contains epoxy resin, bisphenol A and ammonium bentonite.

U.S. Pat. No. 6,197,849 details the preparation of organophilic phyllosilicates by treating naturally occurring or synthetic phyllosilicates with a salt of a quaternary or other cyclic amidine based compound. The patents covers polymeric systems, preferably epoxy resins, polyurethane and rubbers containing such organophilic phyllosilicates. The organophilic phyllosilicates may be added either to the resin or else to the hardener.

EP 0 267 341 A1 discloses a resin composition comprising smectite organoclays of improved dispersibility. In an example, the organoclay is incorporated into component A of a two-Pack Epoxy enamel.

EP 1 209 189 A1 discloses polymer foams containing nanoclay described as nanosized clay of plate-like form, dispersed therein. For example, clay platelet CLOISITE® 10A is dispersed in the polyol part of a polyurethane foam.

An article entitled "Polyurethane nanocomposites Containing Laminated Anisotropic Nanoparticles Derived from Organophilic Layered Silicates" by Carsten Zilg, published in Advanced materials, VCH, Verlagsgesellschaft, Weinheim, D E, vol. 11, No.1 07 Jan. 1999, pages 49-52, discloses a polyurethane nanocomposite material prepared from a polyol dispersion containing ion-exchanged organophilic fluoro-mica and an isocyanate component.

The incorporation of nano clay materials into polymer matrices, to enjoy the above-mentioned benefits, is not straight forward, however. The highly anisotropic nature and large surface area of nano clays can give problems in processing of polymers, particularly where 2 component reactive systems are envisaged. High loadings of the nano clay can result in unacceptably high viscosities, yet high viscosity is what is sought to achieve anti-slump characteristics in reactive systems.

A problem underlying the present invention is to develop two component systems where the components individually are of reasonably low viscosity for ease of processing, particularly for machine dispensed materials, yet which develop high viscosity when the components are mixed together to form a resin that is undergoing curing.

None of the above mentioned prior art documents provide a clue to solve that problem.

We have found that such a property can be achieved from particular blends of platelet additives, e.g. nano clays, and preferably other fillers, for two component reactive systems, combined with distribution of the nano clay material between the two components. Unexpectedly, exceptional non-slump characteristics are achieved indicating a synergism between the blended platelet additives and the curable resin matrix, over and beyond simple addition effects.

A general problem underlying the present invention is to provide a two component composition containing platelet nanofillers that can more readily be mixed, even at high nanofiller loadings. Another aspect of a problem underlying the present invention is to provide a two component composition that, when mixed, has good anti-slumping properties and therefore has a high viscosity at rest while at the same time the individual components have a relatively low viscosity to ensure good mixing.

It has now been found that two-component compositions with platelet nanofillers present in both components (or in at least two components for a multi-component composition) are easier to mix. In addition, it has been found that the mixed composition can have unexpectedly higher viscosities than the individual components have. This opens the way to making curable two part compositions having, when the components are mixed, high viscosities (and hence good anti-slump properties) from components that have relatively low viscosities, allowing them to be readily mixed. This invention therefore unexpectedly extends considerably the capability to use modern thixotropes synergistically within the application process, such that both the requirements for mixing and applying the mixed components and for the final cured product can be expanded

SUMMARY OF THE INVENTION

One aspect of the invention relates to a composition comprising at least two separate reactive components that when mixed together form a reactive resin that undergoes curing, wherein:

at least two of the separate reactive components each includes a filler having a platelet structure ("platelet filler") dispersed in the component. This permits to obtain a mixture whose viscosity is higher than the viscosity of each of the two separate components. In another aspect of the invention, the composition comprising at least two separate reactive components that when mixed together form a reactive resin that undergoes curing, is characterised in that the viscosity of the mixture is higher than the viscosity of each of the two separate components.

Another aspect of this invention relates to a composition comprising at least two reactive components that when mixed together form a reactive resin that undergoes curing, wherein the components, or at least two of the components if there are three or more components, include a filler having a platelet structure, the platelets having a thickness 5 microns or less, preferably less than 1 µm, more preferably less than 25 Å(~2.5 nm), especially less than 10 Å (~1 nm), and most preferably between 4-8 Å (~0.5-0.8 nm), and an aspect ratio (length/thickness) higher than 10, more preferably higher than 50 and most preferably higher than 100 or a mixture thereof. The platelets are preferably separable from each other under shear within the composition.

The present invention also provides a method of mixing the reactive components of the composition defined in the preceding paragraph.

DETAILED DESCRIPTION OF THE INVENTION

The presence of the platelet in the components can provide an additional advantage of improving surface char formation and flame retardancy of the cured resin.

The nanoscale platelet filler may be in the form of a nanocomposite, which is a dispersion of such a filler in a polymer or resin. The filler may be mica or glass flakes or a clay, e.g. a natural or modified montmorillonite.

The nanoscale platelet filler should, as specified above, be present in at least two of the reactive components. Preferably no one component should contain more than 80% by weight of the platelet filler content of the final cured resin since that would generally increase the viscosity of that component to an unacceptably high level. More preferably, the maximum loading of the platelet filler in any one component is 75%, e.g. 60% by weight or less of the total platelet filler content of the final cured resin. Each component preferably includes 0.5 to 10% by weight of the platelet filler, more preferably 1 to 7%, e.g. 2 to 4%.

The nanoscale platelet filler may be surface treated, e.g. with amines, surfactants, reactive materials, (e.g. silanes or siloxanes) to make them compatible with the other ingredients of the component it is incorporated in. Especially preferred are platelet fillers treated with alkyl quaternary ammonium ions that are retained on their surface. Such fillers are commercially available, e.g. Garamite 1958 obtainable from Southern Clay Products Inc.

It has been found that the viscosity of curable compositions formed by mixing two reactive components together can be substantially increased as compared to the viscosities of the individual components especially if, in addition to the platelet filler, minerals, e.g. calcium carbonate, aluminium trihydrate, talc and silicas, which interact with the platelet fillers are incorporated into one or more, and preferably each, of the components. Especially preferred are (a) platelet fillers that have been subject to ion exchange, e.g. to incorporate ammonium ions such as alkyl quaternary ammonium ions, and (b) minerals such as talc, calcium carbonate and silicas that interact with the ammonium-containing platelet filler.

Typical densities of the cured resin containing mineral filler alone will be ~1 to 3 g/cc.

Additional thixotropes may also be added in the form of a silica gel, which preferably contains various siloxane and silanol groups.

It is not required to use the same nanoscale platelet filler in the various components and different platelet materials could be used. However, for sake of simplicity and ensured compatibility, the platelet filler is preferably the same in each of the two reactive components. In addition, mixes of platelet materials could be incorporated into any of the components.

The two reactive components may be chosen from the components of any thermosetting resin. The two reactive components preferably belong to one of the following reactive systems:

Epoxy/Amine
Epoxy/Acrylic/Amine
Isocyanate/Polyol
Alternative hybrid systems may be used, e.g.:
epoxy/isocyanate-polyol/amines
Epoxy/Anhydride
Cyclocarbonate/epoxy/amine The components may be foamable to reduce the weight of the cured resin by incorporating a foaming agent in one or more of the components and/or by frothing the mixed resin by mechanical stirring and/or blowing gas, e.g. air, into it. The foaming agent is preferably thermal- or radiation-activated to produce gas bubbles to expand the matrix of the resin.

The molecular weight and functionality of the monomer/oligomer/polymer content of the components should be chosen to give appropriate properties, e.g. densities, in the final cured resin. A range of different molecular weights may be used.

Other fillers may be incorporated into the components such as:
minerals e.g. talc, calcium carbonate, silicas. Typical densities of the cured resin containing mineraly filler alone will be. ~1 to 3 g/cc microballoons, which are glass or polymeric hollow spheres, and can be used to achieve a cured resin having a lower density, e.g. ~0.4 to 0.9 g/cc. Air or gas can be introduced into the resin being cured either by foaming agents or by mechanically frothing.

The components may be mixed manually or mechanically, e.g. using a planetary mixer, but it is preferred to mix the components by static mixing, i.e. dispensing the components from separate component cartridges into a common conduit, where the components are mixed as they pass through the conduit; static blades in the conduits may assist in the mixing process.

The viscosities of the separate components (preferably measured at a frequency of 0.01593 Hz under the conditions discussed later in connection with the specific Examples) are preferably less than 300,000 Pa·s (i.e. 300 kPa s); the viscosity of the resin immediately after thorough mixing of the components preferably exceeds 500,000 Pa·s.

The resin formed by mixing of the components may be cured at room temperature, which will generally be the case for large structures e.g. aerodynamic wings, wind turbine blades etc, or at elevated temperatures to accelerate the curing, depending on the resin components.

The cured resin may be formed to a desired shape, e.g. to form a model, by machine, e.g. using a CAD-controlled machine tool or by hand and the resin may also be trimmed.

The cured resin may be in any desired form or shape, e.g. a coating or paint covering, an adhesive deposit (as a film, powder, rope or a three dimensional structure or coherent insert), a paste or putty, or a board that can be subsequently machined.

Even when slump is not an especial problem in a given application, e.g. in the formation of an adhesive deposit joining two parts, the high viscosity of the resin as it is curing may well be advantageous, e.g. to keep it in place, especially when applied to vertical or slanted surfaces or the underside of a substrate.

The platelet filler may be a modified or unmodified nanoclay or a nanocomposite; such fillers have already been described above.

A nanocomposite is a dispersion, often a near-molecular blend, of polymer or curable resin molecules and nanoscale particles. Nanocomposites can be formed, as is known in the art, in one of the following three ways: a) melt blending synthesis, b) solvent based synthesis and c) in-situ polymerization, as is known in the art.

There are three structurally different types of nanocomposites: 1) intercalated (individual monomers and polymers are sandwiched between silicate layers) 2) exfoliated (a "sea" of polymer with "rafts" of silicate), and 3) end-tethered (a whole silicate or a single layer of a silicate is attached to the end of a polymer chain).

It is important that the platelet filler should be compatible with the compositions of the resin components so that the filler will disperse as individual platelets or a thin stack of platelets in the components. The compatibility can be achieved by a suitable choice of the filler and in particular, in the case of clay compositions, the nature of the surface groups on the particles of clay materials; surface groups can be incorporated by means of an ion exchange process, which can result in the addition of, for example, ammonium quaternary ions to the surface of the platelet clays. A particular clay of interest that can be used with a broad range of two component compositions is Garamite® for example Garamite® 1958 or Garamite® 1210. Garamite® are Theological additives that are blend of minerals which have been organically modified. It is preferably used in an amount of 1 to 5% in epoxy systems. Garamite 1958 is preferred. It is a modified nanoclay and has alkyl quaternary ammonium ions on the surface of a basic bentonite clay structure.

The organically modified silicate Garamite 1958 is commercially available and is used as a Theological additive in numerous polymer systems such as epoxies and unsaturated polyesters. The addition of Garamite 1958 has been observed to increase the thixotropy of polymer systems and reduce the tendency for sag. This Theological additive can be used as an alternative to other thixotropic agents such as fumed silica.

Another particular clay of interest that can be used with a broad range of two component compositions are Cloisite® additives which consist of organically modified nanometer scale, layered magnesium aluminium silicate platelets of montmorillonite type. The silicate platelets that Cloisite® are derived from are 1 nanometer thick and 40 to 150 nanometer across. Specific examples are Cloisite® 93A and Cloisite® 25A. Surface of Cloisite® 93A has been modified by M2HT; methyl, dihydrogenated Tallow ammonium N+(H)(HT) 2CH3 where HT is Hydrogenated Tallow (approx. 65% C18, 30% C16, 5% C14) with anion:$HSO4^-$. Surface of Cloisite® 25A has been modified by 2MHTL8; dimethyl, dihydrogenatedtallow, 2-ethylhexyl quaternary ammonium with anion methylsulfate. The Cloisite® additives are exfoliated preferably until the individual platelets no longer exhibit an XRD deflection indicating that the platelets are at least 7 nm apart. After exfoliation into primary platelets the platelets are distributed.

As shown in the subsequent examples, the presence of platelet fillers, e.g. Garamite 1958, within the reactive components of a two part resin composition results in the formation of relatively low viscosity pastes possessing a cream like consistency. It has been found surprisingly that when the two components of the two part resin composition both contain this rheological agent and are mixed together in varying proportion (such as 1:1 and 2:1) to form a resin undergoing curing, the resin has an unexpected and significant relatively high viscosity. This phenomenon imparts an advantageous degree of slump resistance.

In one embodiment, one of the reactive components preferable comprises an epoxy resin and the other component includes a hardener for the epoxy resin, e.g. a polyamine or a polyol, or poly-anhydride, or polycyclocarbonate, or hybrids thereof.

The epoxy resin may consist of one or more epoxy resins that are themselves liquid or may be a liquid mixture of one or more solid epoxy resins with one or more liquid epoxy resins or may be one or more solid epoxy resins dissolved in a diluent; diluents are conventionally used in epoxy resin compositions and are well-known. The epoxy resin may be a polyglycidyl ether of a polyhydric alcohol such as 1,4-butanediol or 1,3-propanediol or, preferably, a polyglycidyl ether of a polyhydric phenol, for example a bisphenol such as bis(4-hydroxyphenyl)methane (bisphenol F) or 2,2-bis-(4-hydroxyphenyl)propane (bisphenol A) or a novolak formed from formaldehyde and a phenol such as phenol itself or a cresol, or a mixture of two or more such polyglycidyl ethers. Polyglycidyl ethers of bisphenol A are especially preferred. The epoxy resin, particularly where it comprises a solid epoxy resin, may contain one or more epoxy-functional diluents, usually monoepoxides, or non-epoxide diluents, such as the monoepoxide and non-epoxide diluents conventionally used in curable epoxy resin compositions.

Examples of amines suitable for use as the amine hardener include those aliphatic, cycloaliphatic, aromatic, araliphatic and heterocyclic amines known as hardeners for epoxy resins, including: alkylenediamines such as ethylenediamine or butane-1,4-diamine; polyalkylenepolyamines such as diethylenetriamine, triethylenetetramine, tetraethylenepentamine, dipropylenetriamine or tripropylenetetramine; N-hydroxyalkyl derivatives of polyalkylene polyamines such as N-(hydroxyethyl)diethylenetriamine or mon-N-2-hydroxypropyl derivative of triethylenetetramine; polyoxyalkylenepolyamines such as polyoxyethylene- and polyoxypropylenediamines and triamines; N,N-dialkylalkylenediamines such as N,N-dimethylpropane-1,3-diamine or N,N-diethylpropane-1,3-diamine; cycloaliphatic amines having an amino or aminoalkyl group attached to the ring, such as 3-aminomethyl-3,5,5-trimethylcyclohexylamine (isophoronediamine); aromatic amines such as bis(4-aminophenyl)methane or bis (4-aminophenyl)sulphone; amine-terminated adducts of epoxy resins with aliphatic, cycloaliphatic or araliphatic amines as hereinbefore described; N-aminoalkyl-piperazines such as N-(2-aminoethyl)piperazine or N-(3-aminopropyl) piperazine; and polyaminoamides, for example reaction products of polyalkylenepolyamines such as those hereinbefore mentioned with polymerised unsaturated fatty acids, e.g. polymerised vegetable oil acids such as dimerised or trimerised linoleic or ricinoleic acids; or a mixture of two or more of such amines.

Aliphatic and cycloaliphatic amine hardeners are usually preferred, including N-hydroxyalkyl derivatives of polyalkylene polyamines, particularly a mono-N-2-hydroxypropyl derivative of triethylenetetramine, and mixtures thereof with polyaminoamide reaction products of polyalkylenepolyamines and polymerised vegetable oil acids and the amine functional reaction products of amines and epoxy group containing compounds. The amount of amine hardener is preferably such as to provide from about 0.75 to 1.25 amino hydrogen equivalents per 1,2-epoxide equivalent of the epoxy resin (1).

The hardener may have a dendrimeric structure (e.g. with functional amine, hydroxy or acidic reactive groups).

The components may also contain minor amounts of accelerators (e.g. tertiary amines, etc) and latent hardeners (e.g. dicyanamide, or boron—amine complexes) and additives conventionally used in the particular application, such as diluents, fillers (such as calcium carbonate), fibers, pigments, dyes, fire retardants, antifoaming agents, wetting agents and polymeric toughening agents. Preferably, the paste additionally includes molecular sieves, which function as moisture scavengers, and are well known to those skilled in the art, examples being zeolites with open-network structures. Preferably, the paste also includes surfactants or antifoaming agents such as a silicone surfactant like Dabco DC 197 Surfactant, available from Air Products, though other products are commercially available and well known to those skilled in the art. It has also been found that the addition of calcium stearate improves the machinability of the cured material and so its addition is also advantageous. These auxiliary materials may be conveniently added with any or all of the components.

Techniques for mechanically mixing the components of a curable two-part curable resin, e.g. modelling pastes, and dispensing the mixed resin are known in the art, e.g. by using Tartler Nodopox machinery. The bulk density of the resulting cured articles is usually 0.8 to 1.3 g/cm$^3$, although this will depend on the weight of any filler used, as discussed above.

Conveniently, separate tanks are filled with the two components, e.g. resin and hardener. The application of low pressure to the tanks facilitates pumping of the materials. Preferably, pumps deliver the components from the tanks to a mixing block where they are mixed. The residence time in the mixing block, the speed of mechanical stirring and the length of the hose attached to the chamber influence the homogeneity of the mixture.

The present invention can be used to make a seamless model free of bond lines; typical steps in making such models are:

1. providing a substructure having an exposed outer surface,
2. applying a modelling paste to the outer surface of the substructure in the form of a continuous layer,
3. curing the continuous layer of applied modelling paste, and
4. machining said cured layer of modelling paste to the desired contour.

Cure of the curable resin can be effected in accordance with conventional practice in the particular application. In general, the composition can be allowed to gel (set) at ambient temperature or heated moderately in accordance with conventional practice to accelerate setting. Subsequently, completion of cure may be effected at ambient temperature, moderately elevated temperature or higher temperature as required. Typically, room temperature cure is preferred.

This process is particularly useful for producing model and moulds (direct tooling) within the wind/marine/aerospace/rail and auto industries. This type of physical thixotrope enables storage stable pre-mixed components to be produced. Previous chemical thixotrope, for example the system described in U.S. Pat. No. 6,077,886, suffers from a reduction in the mixed thixotrope over time (chemical thixotropic systems tend to slowly react with time and lead to loss of thixotropy) This physical thixotrope allows stable fabrication of large models and moulds (direct tooling) required within the marine/wind turbine/aerospace/rail and auto industries.

EXAMPLES

The materials of Table 1 are referred to in the following description:

TABLE 1

Raw Materials

| Raw Material | Description of Material | Supplier |
|---|---|---|
| Araldite GY 260 | Bisphenol A epoxy resin | Huntsman Group Vantico Limited |
| Araldite GY 281 | Bisphenol F epoxy resin | Huntsman Group Vantico Limited |
| IP 262 | Isophorone diamine/ Trimethylhexa-methylenediamine adduct | Huntsman Group Vantico Limited |
| IP 271 | Isophorone diamine/ Jeffamine D 230 adduct | Huntsman Group Vantico Limited |
| Dioctyl adipate | Di (2-ethylhexyl)adipate | Petrochem UK Ltd |
| Araldite DY H/BD | Diglycidylether of 1.6 hexenediol | Huntsman Group Vantico Limited |
| Apyral 22/33 | Aluminium hydroxide | Nabaltec |
| Sphericel 110 P8 | Borosilicate glass | Potters industries |
| Q Cel 5028 | Silicic acid, sodium salt, boric acid sodium salt, siloxane | Potters industries |
| Creta fine N 100 | Calcium carbonate | Needham Minerals Limited |
| Coathylene TB 2957 | Ethylene-acrylate-acrylic acid copolymer | Dupont Polymer Powders SA |
| Calofort S | Stearate coated calcium carbonate | Omya UK |
| Jeffamine D 230 | Polyoxypropylenediamine | Huntsman |
| Ruetasolv DI | Diisopropyl naphthalene isomers | Rutgers Kureha Solvents GmbH |
| Accelerator 399 | Triethanolamine, piperazine, aminoethylpiperazine | Huntsman |

TABLE 1-continued

Raw Materials

| Raw Material | Description of Material | Supplier |
|---|---|---|
| Aerosil R202 | Silicones and siloxanes, dimethyl-reaction products with silica | Degussa AG |
| Aerosil R 8200 | Silanamine, hydrolysis products with silica | Degussa AG |
| Bentone SD-2 | Organic derivative of a montmorillinite clay | Elementis Specialties |
| PJ 755 | Titanium dioxide/black iron oxide | PJ Colours Ltd |
| Garamite 1958 | Alkyl quaternary ammonium clay | Southern Clay Products Inc |
| Tetraethylene pentamine (TEPA) | Tetraethylene pentamine | Dow Chemical Company Ltd |
| Aradur 140 | Polyamidoimidazoline | Huntsman Group Vantico Limited |
| Cloisite 25 Å | Modified nanoclay | Rockwood Additives |
| Closite 93 Å | Modified nanoclay | Rockwood Additives |
| Suprasec 2211 | isocyanate compound | Huntsman Polyurethanes |
| Additive Tl | Monofunctional isocyanate compound | Bayer Plc |
| Byk 054 | Foam destroying polymers | Byk Chemie |
| Airflo CC | China Clay | WBB Devon Clays Ltd |
| Polyol PP50 | Ethoxylated pentaerythritol | Perstorp AB |
| Poly G85-29 | Polyether polyol | Arch Chemicals |
| HXA6 | Solid glass beads | Sovitec France SA |
| 1,4 Butanediol | 1,4 Butanediol | Albion Chemical Distribution |
| Baylith L powder | Molecular sieve | Bayer Plc |

None of the fillers used in the formulations stated in Tables 2-4 and 7-8 have undergone any specific drying procedure before being utilized in the manufacture of these specific constituents.

Experimental Procedure

In this specification, all percentage values are percentages by weight.

Formulations 1 to 3

A general process was used for the manufacture of a first formulation (Formulation 1) of a two-part composition, comprising an epoxy resin component and a hardener component The epoxy resin component is formed in a disperser type mixer as follows:
1. Charge GY 260 (39.520%), GY 281(11.530 %), Aradlite DY HB/D (1.980%), Dioctyl adipate (3.460%), Calofort S (5.930%), Apyral 22 (6.120%) and Sphericel 110 P8 (19.3%) into the disperser type mixer together with usual additives such as surfactants, antifoam agents and pigments(1.28%). Start the mixer at a sufficient speed in order to wet out the powders sufficiently.
2. Aerosil R 8200 (1.986%) and Coathylene TB 2957 (5.930%) are then added and mixture mixed for a sufficient period of time to achieve an even dispersion. A vacuum is then applied and the formulation dispersed at high speed in order to achieve a homogeneous suspension. Garamite 1958 (2.960%) is then added, a vacuum applied and the mixture dispersed at high speed at a temperature in excess of 50° C. for a period of 20 minutes in order to achieve a homogeneous mixture The same general process was adopted for the manufacture of the reactive resin components in Formulations 2, 4 and 5 described below.

The general process for the manufacture of hardener component of Formulation 1 in a disperser type mixer was as follows:
1. IP 262 (42.0%), Ruetasolv DI (3.0%), Apyral 22 (21.8%), Sphericel 110 P8 (23.0%) into the disperser type mixer together with usual additives such as surfactants and antifoam agents (1.9%). Start the mixer at a sufficient speed in order to wet out the powders sufficiently. A vacuum is then applied and the formulation dispersed at high speed in order to achieve a homogeneous suspension
2. Coathylene TB 2957 (5.8%) and Garamite 1958 (2.5%) were then added, a vacuum applied and the mixture dispersed at high speed at a temperature in excess of 50° C. for a period of 20 minutes in order to achieve a homogeneous mixture This general procedure was also adopted in the manufacture of the reactive hardener component in Formulations 2, 4 and 5.

The general procedure for the manufacture of the reactive resin component in Formulation 3 in a planetary type mixer was as follows:
1. Charge Araldite GY260 (46.0%), Araldite GY 281 (6.0%), Araldite DY H/BD (3.76%), Dioctyl adipate (2.0%), Apyral 22 (11.48%) Cretafine N100 (10.8%), Q Cel 5028 (14.9%) and other minor ingredients such as surfactants, antifoam agents and pigments (2.3%) into a planetary type mixer. Start the mixer at a sufficient speed in order to wet out the powders sufficiently. Apply a vacuum and mix at a sufficient speed to in order to obtain a homogeneous mixture.
2. Charge Garamite 1958 (2.76%) and start the mixer at a sufficient mix in order disperse this material evenly within the mixture. Apply a vacuum and mix this formulation at sufficient speed at a temperature above 30° C. for a period time in excess of 15 minutes.

The general procedure for the manufacture of the reactive hardener component in Formulation 3 in a planetary type mixer was as follows:
1. Charge Jeffamine D 230 ( 38%), Accelerator 399 (0.5%), Ruetasolv DI (4.0%), Cretafine N100 (22.50%), Apyral 22 (14.0%), Q Cel 5028 (14.7%) and other minor ingredients (0.3%) into a planetary type mixer. Start the mixer at a sufficient speed in order to wet out the powders sufficiently. Apply a vacuum and mix at a sufficient speed to in order to obtain a homogeneous mixture.
2. Charge Aerosil R 8200 (2.0%) and Garamite 1958 (4.0%) and then start the mixer at a sufficient mix in order to disperse this material evenly within the mixture. Apply a vacuum and mix this formulation at sufficient speed at a temperature above 40° C. for a period time in excess of 15 minutes.

Table 2 shows the compositions of the two components of Formulations 1 to 3:

TABLE 2

| Formulation 1 | | | |
|---|---|---|---|
| Resin Composition | Quantity (%) wt | Hardener Composition | Quantity (%) wt |
| Araldite GY 260 | 39.520 | IP 262 Adduct | 42.000 |
| Araldite GY 281 | 11.530 | Sphericel 110 P8 | 23.000 |
| Dioctyl Adipate | 3.460 | Apyral 22 | 21.800 |
| Araldite DY H/BD | 1.980 | Coathylene TB 2957 | 5.800 |
| Apyral 22 | 6.120 | Ruetasolv DI | 3.000 |
| Sphericel 110 P8 | 19.30 | Garamite 1958 | 2.500 |
| Coathylene TB 2957 | 5.930 | Additives | 1.900 |

TABLE 2-continued

Formulation 1

| Resin Composition | Quantity (%) wt | Hardener Composition | Quantity (%) wt |
|---|---|---|---|
| Calofort S | 5.930 | | |
| Garamite 1958 | 2.960 | | |
| Aerosil R 8200 | 1.986 | | |
| Additives | 1.284 | | |

TABLE 3

Formulation 2

| Resin Composition | Quantity (%) wt | Hardener Composition | Quantity (%) wt |
|---|---|---|---|
| Araldite GY 260 | 40.000 | IP 271 Adduct | 39.000 |
| Araldite GY 281 | 10.000 | Sphericel 110 P8 | 15.000 |
| Dioctyl Adipate | 3.500 | Apyral 22 | 23.248 |
| Araldite DY H/BD | 2.000 | Coathylene TB 2957 | 6.000 |
| Apyral 22 | 10.000 | Ruetasolv DI | 4.000 |
| Sphericel 110 P8 | 14.800 | Garamite 1958 | 2.000 |
| Coathylene TB 2957 | 6.500 | Calofort S | 8.600 |
| Calofort S | 6.000 | Other minor ingredients | 2.152 |
| Garamite 1958 | 2.500 | | |
| Aerosil R 8200 | 2.000 | | |
| Other minor ingredients | 2.700 | | |

TABLE 4

Formulation 3

| Resin Composition | Quantity (%) wt | Hardener Composition | Quantity (%) wt |
|---|---|---|---|
| Araldite GY 260 | 46.000 | Jeffamine D 230 | 38.000 |
| Araldite GY 281 | 6.000 | Accelerator 399 | 0.500 |
| Dioctyl Adipate | 2.000 | Apyral 22 | 14.000 |
| Araldite DY H/BD | 3.760 | Cretafine N 100 | 22.500 |
| Apyral 22 | 11.480 | Q Cel 5028 | 14.700 |
| Q Cel 5028 | 14.900 | Ruetasolv DI | 4.000 |
| Cretafine N 100 | 10.800 | Aerosil R 8200 | 2.000 |
| Garamite 1958 | 2.760 | Garamite 1958 | 4.000 |
| Other minor ingredients | 2.300 | Other minor ingredients | 0.300 |

Evaluation of Formulations

The pastes are evaluated as follows.
1. The slump resistance of the paste is measured immediately after mixing and prior to curing The curing takes place immediately on mixing and is not delayed. The thixotropic nature of the paste is immediately observed whilst being dispensed. The paste was dispensed utilising Tarder Nodopox machinery at a thickness of 10-50 mm horizontally onto a vertical surface. This method allows evaluation of the degree of sag visually at different application thicknesses. The thickness of the strips of paste are measured using a ruler. If the shape of the strips starts to distort and move down the vertical surface onto which they are applied then the material is effectively slumping. Table 6 gives values of slump resistance measured.
2. The density is measured at 23° C. in accordance with ISO 1183.
3. The viscosities (i.e. dynamic viscosities) of the individual components of the reactive resin and the hardener and the mixture of the two were measured at 25° C. using a TA Instruments Rheometer AR 2000. An internal test method is used to measure the viscosity at a frequency of 0.01593 Hz, geometry 2 cm diameter serrated plate (formulations 1-5, 21-23). In the case of formulations 6-20 a 2 cm diameter 2° cone and plate geometry was used. The shear rate was then increased in a continuous ramp from 1 Hz to 50 Hz over a period of one minute.
4. Linear shrinkage is measured by dispensing the mixed paste from the Tartler Nodopx into a mould with the dimensions of 1000×60×40 mm. The degree of shrinkage is recorded after 7 days curing at room temperature.
5. The Shore D hardness is measured on the cured samples in accordance with ISO 868.

Table 5 shows the viscosity values of the components and the mixed resin of Formulations 1 to 3; where more than one value was taken, the range of the measured values is shown in Table 5:

The below mentioned viscosities are expressed in Pa·s units. Viscosity can also be expressed in kPa or in cP units, with 1 kPa s=1 cP=1000 Pa s.

To make it clear, the viscosity value of, for example, the reactive resin component of Formulation 1 is 135,000 Pa s which means 135 000 Pa s and corresponds to 135 kPa s and to 135 cP.

In the below examples, when the viscosity value contains a significant centime part it shall be mentioned for example as 56.08 Pa s.

TABLE 5

Viscosity measurements of individual and mixed components

| | Formulation 1 Viscosity @ 0.01593 Hz (Pa·S) | Formulation 2 Viscosity @ 0.01593 Hz (Pa·S) | Formulation 3 Viscosity @ 0.01593 Hz (Pa·S) |
|---|---|---|---|
| Reactive resin component | 135,000 | 56,500-106,100 | 3,074-7,890 |
| Reactive hardener component | 12,830 | 27,000-49,850 | 17,490 |
| Mixed components | 301,800 | 338,000-342,000 | 235,500-265,000 |

As clearly seen, the viscosity of the mixed resin is substantially greater than that of either of the component parts. Table 6 sets out the physical properties of thixotropic seamless modelling pastes of Formulations 1 to 3

TABLE 6

Physical properties of thixotropic seamless modelling pastes

| Physical Properties | Formulation 1 | Formulation 2 | Formulation 3 |
|---|---|---|---|
| Density | 1.2/1.17 | 1.24/1.25 | 0.88/0.87 |
| Consistency | Thixotropic paste | Thixotropic paste | Thixotropic paste |
| Slump resistance | >40 mm | 40 mm | 30 mm |
| Cracks | None | None | None |
| Shore D Hardness (Fully cured) | 75 | 78 | 75-77 |
| Linear shrinkage 1000 mm length, 40 mm thickness | 1 mm | 0.5 mm | 1 mm |

Comparative Formulations 4 and 5

Formulations 4 and 5, which are comparable to Formulations 1 to 3, were made but one did not include the platelet filler (Garamite) in the epoxy resin component and Formulation 5 did not include the platelet filler (Garamite) in either component. Tables 7 and 8 set out the compositions of these Formulations:

TABLE 7

Formulation 4 (no platelet filler in epoxy resin component)

| Resin Composition | Quantity (%) wt | Hardener Composition | Quantity (%) wt |
|---|---|---|---|
| Araldite GY 260 | 42.000 | IP 262 Adduct | 42.000 |
| Araldite GY 281 | 10.500 | Sphericel 110 P8 | 23.000 |
| Dioctyl Adipate | 3.500 | Apyral 22 | 21.800 |
| Araldite DY H/BD | 2.800 | Coathylene TB 2957 | 5.800 |
| Snowcal 40 | 9.670 | Ruetasolv DI | 3.000 |
| Sphericel 110 P8 | 11.600 | Garamite 1958 | 2.500 |
| Coathylene TB 2957 | 5.830 | Other minor ingredients | 1.9% |
| Calofort S | 5.000 | | |
| Bentone SD-2 | 2.500 | | |
| Aerosil R 8200 | 2.000 | | |
| Aerosil R 202 | 3.500 | | |
| Other minor ingredients | 1.1 | | |

TABLE 8

Formulation 5 (no platelet filler in either component)

| Resin Composition | Quantity (%) wt | Hardener Composition | Quantity (%) wt |
|---|---|---|---|
| Araldite GY 260 | 42.000 | IP 262 Adduct | 46.000 |
| Araldite GY 281 | 10.500 | Sphericel 110 P8 | 14.000 |
| Dioctyl Adipate | 3.500 | Apyral 33 | 12.200 |
| Araldite DY H/BD | 2.800 | Coathylene TB 2957 | 4.000 |
| Snowcal 40 | 9.660 | Airflo CC | 9.000 |
| Sphericel 110 P8 | 10.600 | Aerosil R 202 | 4.000 |
| Coathylene TB 2957 | 5.000 | Aerosil R 8200 | 4.500 |
| Calofort S | 5.000 | Ruetasolv DI | 5.6 |
| Bentone SD-2 | 3.000 | Other minor ingredients | 1.2 |
| Aerosil R 8200 | 2.500 | | |
| Aerosil R 202 | 4.300 | | |
| Other minor ingredients | 1.14 | | |

Table 9 shows the viscosity values of the components and the mixed resin of Formulations 4 and 5; where more than one value was taken, the range of the measured values is shown in Table 9

TABLE 9

Viscosity measurements of Formulations 4 and 5 stored at room temperature

| | Formulation 4 Viscosity @ 0.01593 Hz (Pa · S) | Formulation 5 Viscosity @ 0.01593 Hz (Pa · S) |
|---|---|---|
| Reactive resin component | 313,500-315,700 | 553,100-582,600 |
| Reactive hardener component | 14,980-25,220 | 2,951-5,974 |
| Mixed components | 38,880-197,700 | 113,100-205,600 |

Table 9 shows a drop in viscosity on mixing. Table 9 clearly shows that the increased viscosity values shown in Table 5 are not due to partial curing of the Formulations.

Table 10 shows the physical properties of Formulations 4 and 5 following mixing:

TABLE 10

Physical properties

| Physical Properties | Formulation 4 | Formulation 5 |
|---|---|---|
| Density | 1.26/1.17 | 1.24/nd |
| Consistency | Thixotropic paste | Thixotropic paste |
| Slump resistance | >30 mm | 40 mm |
| Cracks | None | None |
| Shore D Hardness (Fully cured) | 75 | n/d |
| Linear shrinkage 1000 mm length, 40 mm thickness | 1 mm | n/d |

This effect of heightened thixotropy when combining the individual reactive resin and reactive hardener component is only noted when Garamite 1958 (alkyl quaternary ammonium clay) is present in both components (see Formulation 4 where only one of these components i.e. the hardener contains Garamite). In Formulation 4, the reactive epoxy resin component contains two silica based thixotropes possessing various siloxane and silanol groups on the surface. A third Theological agent (Bentone SD-2) is also present and is classified as an organic derivative of a montmorillonite clay When combined using the standard mixing and dispersing method the resultant paste does not exhibited a viscosity significantly higher than that of both individual components. Formulation 4 is similar in nature to Formulation 1. The slump resistance in Formulation 4 is lower than that Formulation 1 which concurs with a lower mixed viscosity.

In the case of Formulation 5, the reactive epoxy resin component again contains two silica based thixotropes possessing various siloxane and silanol groups on the surface along with an organic derivative of a montmorillonite clay (Bentone SD-2). The hardener constituent contains only two silica based thixotropes and hence no clay based thixotrope was present in this component. The reactive epoxy resin component used in Formulation 5 had a higher viscosity than the reactive epoxy resin component used in Formulation 4. However, when combined with the hardener component, Formulation 5 shows a reduction in the viscosity of the mixed system in relation to that of the individual reactive resin component of 60%. Formulation 5 is therefore another example where the absence of a particular type of clay material in both the reactive resin and hardener components does not initiate an increase in viscosity of the mixed system in relation to the viscosity of the individual reactive components.

Formulations 6 to 14

Formulations 6 to 14 are adhesive compositions.

As set out in Table 11, Formulations 6 to 8, each contained a component of a two-part curable resin, i.e. either a resin (Araldite GY260) or a hardener for the resin (Aradur 140 or TEPA). Component Formulations 9 to 14 also contained an alkyl quaternary ammonium clay (Garamite 1958). Formulations 6 to 14 were prepared by mixing the raw materials by hand at room temperature under ambient conditions until a homogeneous composition was obtained. Each resin composition was made in an amount of approximately 100 g and each hardener composition in an amount of approximately 50 g.

TABLE 11

Chemical composition

| Component Formulation No | Quantity of GY 260 (%) | Quantity of Aradur 140 (%) | Quantity of TEPA (%) | Quantity of Garamite 1958 (%) |
|---|---|---|---|---|
| 6 | 100 | | | |
| 7 | | 100 | | |
| 8 | | | 100 | |
| 9 | 98 | | | 2 |
| 10 | | 98 | | 2 |
| 11 | | | 98 | 2 |
| 12 | 96 | | | 4 |
| 13 | | 96 | | 4 |
| 14 | | | 96 | 4 |

The viscosity of Component Formulations 6 to 14 was measured using the procedures outlined above using a shear frequency of 4 Hz and the results are set out in Table 12.

TABLE 12

Viscosity of individual and mixed component formulations

| Component Formulation No | Viscosity at 4 Hz (Pa · s) |
|---|---|
| 6 | 12.13 |
| 7 | 21.05 |
| 8 | 0.18 |
| 9 | 16.79 |
| 10 | 24.19 |
| 11 | 0.21 |
| 12 | 25.93 |
| 13 | 37.77 |
| 14 | 0.55 |

Component Formulations 6 to 14 were mixed together by hand in the proportions set out in Table 13 to form curable compositions containing one resin Component Formulation (6, 9 or 12) and one hardener Component Formulation (7, 8, 10, 11, 13 or 14). The viscosity of each curable composition was measured immediately after mixing using the procedures outlined above but with a shear frequency of 4 Hz and the results are set out in Table 13.

TABLE 13

| Formulation | Ratio of Resin Component Formulation (6, 9 or 12) to Hardener Component Formulation (7, 8, 10, 11, 13 or 14) | Viscosity of mixed components at 4 Hz (Pa · s) |
|---|---|---|
| 6 + 7 | 100:65 | 14.15 |
| 6 + 8 | 100:14 | 4.351 |
| 9 + 10 | 100:65 | 21.23 |
| 9 + 11 | 100:14 | 6.114 |
| 12 + 13 | 100:65 | 37.29 |
| 12 + 14 | 100:14 | 16.61 |

Component Formulations 15 to 20

As set out in Table 14, Component Formulations 15 to 20 each contained a component of a two-part curable resin, i.e. either a resin (Araldite GY260) or a hardener for the resin (Aradur 140 or TEPA). All Component Formulations also contained an alkyl quaternary ammonium clay (Garamite 1958) and fillers (Apyral 22, Calofort S and Sphericel 110 P8)

TABLE 14

| | Quantity (%) | | | | | |
|---|---|---|---|---|---|---|
| Component Formulation No | 15 | 16 | 17 | 18 | 19 | 20 |
| Tetraethylene pentamine | 67.2 | 65.2 | | | | |
| Aradur 140 | | | 67.2 | 65.2 | | |
| Araldite GY 260 | | | | | 67.2 | 65.2 |
| Garamite 1958 | 2 | 4 | 2 | 4 | 2 | 4 |
| Apyral 22 | 10 | 10 | 10 | 10 | 10 | 10 |
| Calofort S | 6 | 6 | 6 | 6 | 6 | 6 |
| Sphericel 110 P8 | 14.8 | 14.8 | 14.8 | 14.8 | 14.8 | 14.8 |

The viscosities of the individual component formulations and mixtures of the formulations, as set out in Table 15 were measure using the procedure set out above at a shear frequency of 4 Hz.

TABLE 15

Viscosity of individual and mixed components

| Formulation | Ratio of Resin Component Formulation (19 or 20) to Hardener Component Formulation (15 to 18) | Viscosity at 4 Hz (Pa · s) |
|---|---|---|
| 15 | | 2.975 |
| 16 | | 13.94 |
| 17 | | 53.37 |
| 18 | | 80.66 |
| 19 | | 42.38 |
| 20 | | 51.05 |
| 19 + 15 | 100:14 | 16.51 |
| 19 + 17 | 100:14 | 61.76 |
| 20 + 16 | 100:65 | 41.19 |
| 20 + 18 | 100:65 | 124.7 |

The introduction of clay in the form of Garamite 1958 (concentration of 2 to 4%) into the reactive resin (formulation 6) and hardener components (formulation 7 and 8) increased the viscosity of these individual components (see Table 12). This would be expected due to the platelet like structure of the clay.

Similarly, the viscosity of the reactive resin and hardener components containing nanoclay was higher than the viscosity of the mixed reactive resin and hardener constituents without nanoclays (see formulation 6+7 and 6+8 compared with 9+10 and 9+11 in Table 13).

The use of nanoclay and additional fillers that interact with the nanoclay (Apyral 22, Calofort S and Sphericel 110 P8), increases the viscosity of the individual resin and hardener components (Table 15, Formulation 15-20) compared to the corresponding formulations without the additional fillers, i.e. containing, as fillers, solely the clay constituent (Table 12 formulations 9-14). However, the viscosity of a mixture of the resin and hardener components that each contain both nanoclay and the additional fillers showed an unexpected increase as compared to the viscosity recorded for individual resin and hardener components, see the combination of (a) formulations 17 and 19 and (b) formulations 18 and 20 (Table 15). This is principally the same effect observed for formulations 1, 2 and 3.

Formulation 21 (Epoxy-amine Resin with Cloisite® Platelets)

Experimental Procedure

General Process for the manufacture of formulation 21 resin component using a disperser and planetary type mixer 1. Charge Araldite GY260 (46.0%), Araldite GY 281 (6.0%), Araldite DY HIBD (3.76%), Dioctyl adipate (2.0%) into container. Disperse using a Disparmat for five minutes at 1000 min$^{-1}$. Charge Apyral 22 (11.48%) Cretafine N100 (10.8%), Q Cel 5028 (14.9%), Cloisite 25 Å (2.76%) and other minor ingredients (2.3%) into a container and disperse for 15 minutes @ 2000 min$^{-1}$.
2. Mix was then transferred to a planetary type mixer. A vacuum was applied and mixed at sufficient speed at 50° C. for twenty minutes to in order to obtain a homogeneous mixture.

General procedure for the manufacture of the reactive hardener component in formulation 21 using a disperser and planetary type mixer
1. Charge Jeffamine D 230 (37.53%), Accelerator 399 (0.49 %) and Ruetasolv DI (3.95%) into a container. Disperse using a Disparmat for five minutes at 1000 min$^{-1}$. Charge Cretafine N100 (22.21%), Apyral 22 (13.83%), Q Cel 5028 (14.55%), Cloisite 25 Å (3.95%) and other minor ingredients (0.3%) into a container and disperse for 15 minutes @ 2000 min$^{-1}$.
2. Mix was then transferred to a planetary type mixer. A. vacuum was applied and mixed at sufficient speed at 50° C. for twenty minutes to in order to obtain a homogeneous mixture.

Formulation 22

The sane experimental procedure was used to produce Formulation 22

TABLE 16

Formulation 21

| Resin Composition | Quantity (%) wt | Hardener Composition | Quantity (%) wt |
|---|---|---|---|
| Araldite GY 260 | 46.0 | Jeffamine D230 | 37.53 |
| Araldite GY 281 | 6.0 | Accelerator 399 | 0.49 |
| Dioctyl Adipate | 2.0 | Apyral 22 | 13.83 |
| Araldite DY H/BD | 3.76 | Cretafine N100 | 22.21 |
| Apyral 22 | 11.48 | Q Cel 5028 | 14.55 |
| Cretafine N 100 | 10.8 | Ruetasolv DI | 3.95 |
| Q Cel 5028 | 14.90 | Aerosil R8200 | 1.7 |
| Cloisite 25 Å | 2.76 | Cloisite 25 Å | 3.95 |
| PJ 755 | 2.0 | Aerosil R202 | 1.49 |
| Byk 065 | 0.3 | Byk 065 | 0.3 |

TABLE 17

Formulation 22

| Resin Composition | Quantity (%) wt | Hardener Composition | Quantity (%) wt |
|---|---|---|---|
| Araldite GY 260 | 46.0 | Jeffamine D230 | 37.53 |
| Araldite GY 281 | 6.0 | Accelerator 399 | 0.49 |
| Dioctyl Adipate | 2.0 | Apyral 22 | 13.83 |
| Araldite DY H/BD | 3.76 | Cretafine N100 | 22.21 |
| Apyral 22 | 11.48 | Q Cel 5028 | 14.55 |
| Cretafine N 100 | 10.8 | Ruetasolv DI | 3.95 |
| Q Cel 5028 | 14.90 | Aerosil R8200 | 1.7 |
| Cloisite 25 Å | 2.76 | Cloisite 93 Å | 3.95 |
| PJ 755 | 2.0 | Aerosil R202 | 1.49 |
| Byk 065 | 0.3 | Byk 065 | 0.3 |

TABLE 18

Viscosity measurement

| | Formulation 21 Viscosity @ 0.01593 Hz (Pa · S) | Formulation 22 Viscosity @ 0.01593 Hz (Pa · S) |
|---|---|---|
| Reactive resin component | 3,455 | 56.08 |
| Reactive hardener component | 566.1 | 359.1 |
| Mixed components | 4040 | 1072 |

Formulation 23 (Polyurethane Example)

Experimental Procedure

General Process for the manufacture of formulation 23 isocyanate component using a planetary type mixer
1. Charge Suprasec 2211(78.6%) and Additive TI (1%) into a container. Disperse under vacuum for twenty minutes.
2. Charge Airflo CC (9.06%), Cretafine N100 (7.780%), Garamite 1958 (3.0%) and other minor ingredients (0.3%) into the container and mix for sixty minutes under vacuum at 80° C. Allow to cool to room temperature and transfer to storage jars General procedure for the manufacture of the polyol component in formulation 23 using a disperser and planetary type mixer
1. Charge Polyol PP50 (36.0%), Poly G85-29 (2.0%), 1,4 Butanediol (8.0%) and Ruetasolv DI into a container. Disperse under vacuum for twenty minutes.
2. Charge Cretafine N100 (16.5%), Airilo CC (12.0%), HXA6 (12.0%) and, Garamite 1958 (3.95%) into a container and mix for 60 minutes under vacuum at 80° C.
3. The mix was allowed to cool to room temperature and Baylith L (5.0%) charged into the vessel. A vacuum was applied and mixed at sufficient speed for twenty minutes to in order to obtain a homogeneous mixture.

TABLE 19

Formulation 23

| Isocyanate Composition | Quantity (%) wt | Polyol Composition | Quantity (%) wt |
|---|---|---|---|
| Suprasec 2211 | 78.86 | Polyol PP50 | 36.0 |
| Additive TI | 1.0 | Poly G85-29 | 2.0 |
| Garamite 1958 | 3.0 | 1,4 Butanediol | 8.0 |
| Byk 054 | 0.3 | Aerosil R 8200 | 1.0 |
| Airflo CC | 9.06 | Garamite 1958 | 2.5 |
| Cretafine N100 | 7.780 | HXA6 | 12.0 |
| | | Ruetasolv DI | 5.0 |
| | | Airflo CC | 12.0 |
| | | Cretafine N100 | 16.5 |
| | | Baylith L Powder | 5.0 |

TABLE 20

Viscosity measurement for formulation 23

| | Formulation 23 Viscosity @ 0.01593 Hz (Pa · S) |
|---|---|
| Reactive resin component | 248.4 |
| Reactive hardener component | 522.8 |
| Mixed components | 1375 |

The invention claimed is:

1. A composition comprising at least two separate reactive components that when mixed together form a reactive resin that undergoes curing wherein at least two of the separate reactive components each includes a nanoscale platelet filler and aluminum trihydrate that interacts with the nanoscale platelet filler dispersed in the reactive component and wherein the nanoscale platelet filler in at least one of the reactive components comprises alkyl ammonium ions on the surface of a basic bentonite clay structure.

2. The composition according to claim 1 wherein the viscosity of the reactive resin is higher than the viscosity of each of the at least two separate reactive components.

3. The composition according to claim 1 wherein the nanoscale platelet filler has a thickness of less than 1 micron.

4. The composition according to claim 1 wherein the nanoscale platelet filler has an aspect ratio higher than 10.

5. The composition according to claim 1 wherein the nanoscale platelet filler is present in each reactive component at an amount of 0.5 to 10% by weight based on the total weight of the reactive component.

6. The composition according to claim 1 wherein the reactive resin is selected from the group consisting of: an epoxy and an amine; an epoxy, an acrylic and an amine; an isocyanate and a polyol; an epoxy, an isocyanate, a polyol and an amine; an epoxy and an anhydride; and a cyclocarbonate, an epoxy and an amine.

7. The composition according to claim 1 wherein the viscosity of each of the reactive components is less than 300,000 Pa s and the viscosity of the reactive resin immediately after thorough mixing of the reactive components exceeds 500,000 Pa s.

8. A composition comprising at least two separate reactive components that when mixed together form a reactive resin that undergoes curing wherein one separate reactive component comprises:
   30-80% by weight of an epoxy resin;
   0.5-5% by weight of a nanoscale platelet filler having alkyl ammonium ions on the surface of a basic bentonite clay structure;
   5-40% by weight of aluminum trihydrate that interacts with the nanoscale platelet filler; and
   0-50% by weight of an inert filler;
   and one other separate reactive component comprises:
   30-70% by weight of an amine hardener;
   0.5-5% by weight of a nanoscale platelet filler having alkyl ammonium ions on the surface of a basic bentonite clay structure;
   5-40% by weight of aluminum trihydrate that interacts with the nanoscale platelet filler; and
   0-60% by weight of an inert filler.

* * * * *